No. 853,454. PATENTED MAY 14, 1907.
G. HOLMGREN.
CLUTCH FOR CENTRIFUGAL MACHINES.
APPLICATION FILED JULY 23, 1901.

WITNESSES:

INVENTOR
Gustaf Holmgren
BY
Kenyon & Kenyon
ATTORNEYS

UNITED STATES PATENT OFFICE.

GUSTAF HOLMGREN, OF NEWARK, NEW JERSEY, ASSIGNOR TO UNITED STATES BUTTER EXTRACTOR COMPANY, A CORPORATION OF NEW JERSEY.

CLUTCH FOR CENTRIFUGAL MACHINES.

No. 853,454.     Specification of Letters Patent.     Patented May 14, 1907.

Application filed July 23, 1901. Serial No. 69,397.

*To all whom it may concern:*

Be it known that I, GUSTAF HOLMGREN, a subject of the King of Sweden, and a resident of Newark, in the county of Essex and State of New Jersey, have invented a new and useful Improvement in Clutches for Centrifugal Machines, of which the following is a specification.

This invention relates to driving mechanism, more particularly designed for use in connection with centrifugal cream separators.

The invention seeks to provide reliable quick action and efficient clutch mechanism, whereby the driving wheel and its shaft may be connected and disconnected at the will of the operator.

The invention consists in the construction hereinafter set forth and described in the claims.

In the accompanying drawings, the invention is shown in connection with, and as applied to a centrifugal cream separator.

Figure 1:
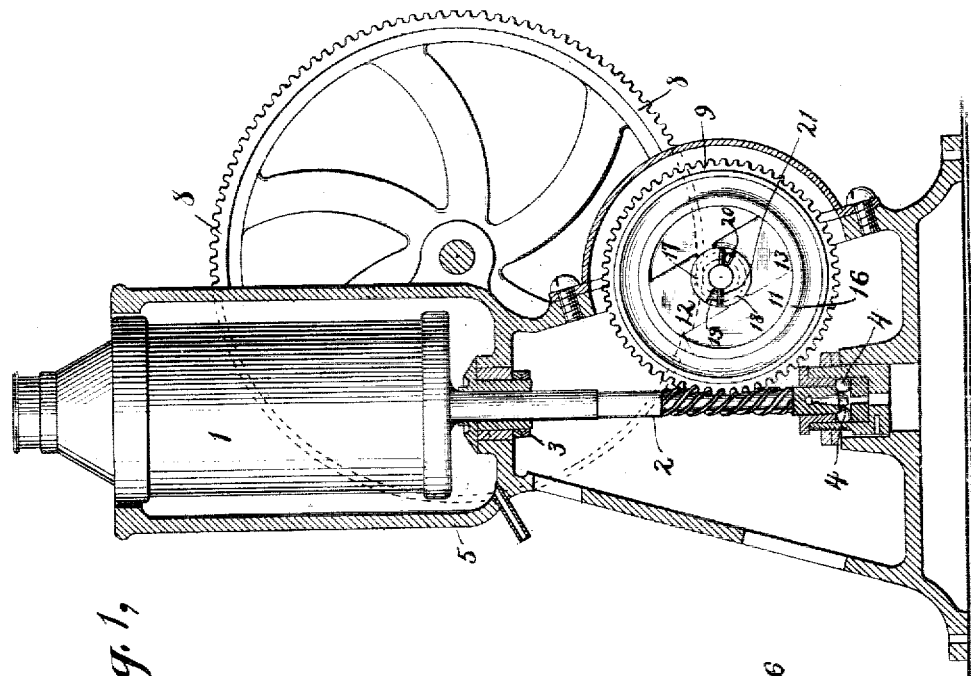
Figure 3:
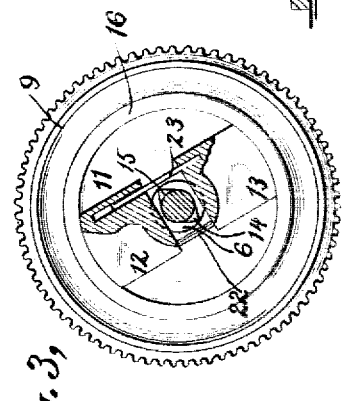
Figure 2:
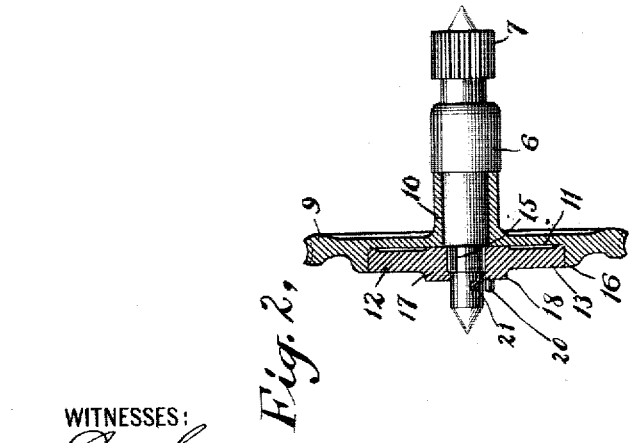

Figure 1 is a sectional elevation of a centrifugal cream separator and showing the improved clutch in connection therewith. Fig. 2 is an elevation partly in section, showing the driving shaft and gear wheels together with the clutch. Fig. 3 is a plan view partly in section of the gear wheel and clutch carried on the driving shaft.

Referring now more particularly to the specific embodiment of the invention, 1 is the bowl of the centrifugal separator rigidly connected with the worm spindle 2, which is mounted in bearings 3 and 4 of the main frame 5. The driving shaft 6 is suitably supported in bearings in the frame 5, and carries at one end gear 7, which meshes with and is driven by the hand wheel 8. On the other end of the shaft 6 is a worm gear wheel 9 having an extended hub 10 and loosely mounted on the shaft. The wheel 9 on the side opposite to the hub 10 has a circular recess 11.

12 and 13 are two separate and independent plates or members of the clutch device loosely mounted on the shaft 6 and located in the recess 11. The shaft 6 is provided with two lateral projections or ears 15 and 14 arranged to work against the inner ends of the plates 12 and 13, thereby thrusting the plates outward so as to engage the rim 16, which constitutes the periphery of the recess 11. The plates 12 and 13 are respectively provided with half collars 17 and 18 surrounding the shaft 6, just beyond the projections 14 and 15, and are also provided respectively with lugs 19 and 20 on the outer faces of the collars 17 and 18. (See Fig. 1.)

21 is a pin which passes through a hole in the shaft 6, and is of sufficient length to engage the lugs 19 and 20.

22 and 23 are pins fixed to the inner end of the plate 13 and projecting loosely into corresponding sockets in the plate 12. These pins merely serve to keep the plates in proper relative position with respect to each other, while at the same time permitting the plates to move to and from each other. The plates 12 and 13 have a circumferential movement on the shaft 6, which is limited in one direction by the pin 21, whose projecting ends engage the lugs 19 and 20 and so limits the movement of the plates. The projecting ends of the pin 21 thus constitute a stop for the plates 12 and 13. A movement of the plates in the other direction throws them outward so as to engage the rim 16.

When the shaft 6 is rotated, its projections 15 and 14 thrust outward the plates 12 and 13 against the rim 16, thereby firmly clutching the wheel 9. When the shaft is turned in the opposite direction, the projections 14 and 15 disengage the plates 12 and 13, permitting them to unclutch the wheel 9, the pin 21 at the same time being carried back against the lugs 19 and 20, thereby locking the plates 12 and 13 on the shaft so as to prevent the shaft from turning far enough around relatively to the plates to throw the opposite sides of the projections against the plates 12 and 13.

In the practical operation of the gear wheel 9 and the spindle 2, when the driving of the shaft 6 ceases, the wheel 9 continues to rotate, being itself driven by the worm on the spindle 2. This movement of the wheel 9 frees the plates 12 and 13 from clutching engagement, but nevertheless carries these plates round on the shaft 6 until the lugs 19 and 20 strike the pin 21 which stops the plates. If this movement of the plates were not stopped, they would be carried around until the projections engaged them and threw them out into clutching engagement with the rim 16, thereby violently stopping the wheel 9 or breaking the parts.

It is obvious that various changes in the form and arrangement of the clutch may be made without departing from the spirit of the invention.

What I claim as new and desire to secure by Letters Patent, is:—

1. The combination of a shaft mounted in bearings, a wheel mounted loosely upon said shaft and provided with an annular flange, a plate or member interposed between said shaft and flange and capable of a circumferential movement with relation to the shaft and flange and a lateral projection on said shaft arranged to move into or out of contact with the inner end of said plate or member when the shaft turns in one direction or the other with relation to said plate or member.

2. The combination of a shaft mounted in bearings, a wheel mounted loosely upon said shaft and provided with an annular flange, a plurality of plates or members interposed between said shaft and flange and each capable of circumferential movement with relation to the shaft and flange and lateral projections on said shaft corresponding in number to said plates and arranged to move into or out of contact with the inner ends of said plates or members when the shaft turns in one direction or the other with relation to said plates or members.

3. The combination of a shaft mounted in bearings and provided with a lateral integral projection, a wheel mounted loosely upon said shaft and provided with an annular flange, a plate or member interposed between said shaft and flange and concentrically mounted on said shaft so as to be capable of a circumferential movement on the shaft and arranged to be actuated by the projection bearing upon its edge nearest to the shaft so as to engage the flange when so actuated, and means on the shaft for preventing the projection from operating the plate when the shaft or wheel is turned relatively to the other in one direction.

4. The combination of a shaft mounted in bearings and provided with a plurality of lateral integral projections, a wheel mounted loosely upon said shaft and provided with an annular flange, a plurality of plates or members interposed between said shaft and flange and concentrically mounted on said shaft so as to be capable of a circumferential movement on the shaft, and arranged to be actuated by the projections bearing upon the edges of the plates nearest the shaft so as to engage the flange when so actuated, and means on the shaft for preventing the projections from operating the plates when the shaft or wheel is turned relatively to the other in one direction.

5. The combination of a shaft mounted in bearings and provided with a lateral integral projection, a wheel mounted loosely upon said shaft and provided with an annular flange, a plate or member interposed between said shaft and flange and concentrically mounted on said shaft so as to be capable of a circumferential movement on the shaft and arranged to be actuated by the projection bearing upon its edge nearest to the shaft so as to engage the flange when so actuated, a projection on the plate or member, and a second lateral projection on the shaft for engaging the plate projection when the shaft or wheel is turned relatively to the other in one direction for preventing the plates from being operated to engage with the flange.

6. The combination of a shaft mounted in bearings and provided with a plurality of lateral integral projections, a wheel mounted loosely upon said shaft and provided with an annular flange, a plurality of plates or members interposed between said shaft and flange and concentrically mounted on said shaft so as to be capable of a circumferential movement on the shaft, and arranged to be actuated by the projections bearing upon the edges of the plates nearest the shaft so as to engage the flange when so actuated, a projection on each plate, and projections on the shaft for engaging with the plate projections when the shaft or wheel is turned relatively to the other in one direction for preventing the plate from being operated to engage with the flange.

7. The combination of a shaft mounted in bearings, a wheel mounted loosely upon said shaft and provided with an annular flange, two diametrically placed plates or members interposed between said shaft and flange and capable of circumferential movement with relation to the shaft and flange and two oppositely placed lateral projections on said shaft arranged to move into or out of contact with the inner end of said plates or members when the shaft turns in one direction or the other with relation to said plates or members.

8. The combination of a shaft mounted in bearings, a wheel mounted loosely upon said shaft and provided with an annular flange, two diametrically placed plates or members interposed between said shaft and flange and capable of circumferential movement with relation to said shaft and flange, guides for said plates or members and two oppositely placed lateral projections on said shaft for causing radial movement of said plates respectively.

9. The combination of a shaft mounted in bearings and provided with lateral integral projections on opposite sides of the shaft, a wheel mounted loosely upon said shaft and provided with an annular flange, plates or members interposed between said shaft and flange and on opposite sides of the shaft and capable of a circumferential movement on the shaft and arranged to be actuated by the projections on the shaft bearing upon the edges of the plates nearest the shaft, so as to engage the flange when so actuated, and pins extending in lines transverse to the shaft and entering recesses in one or both plates for guiding the plates toward and away from said flange.

10. The combination of a shaft mounted in bearings, and provided with two oppositely placed lateral projections, a wheel mounted loosely on said shaft and provided with an annular flange, two clutching members within said annular flange placed so as to be movable radially approximately at right angles to the line joining the extremities of said projections, when the shaft is at rest, one half collars on said plates bearing on said shaft and a second pair of projections on the shaft arranged to make contact with said half collars when the first named pair of projections is inoperative.

In testimony whereof, I have signed my name to this specification, in the presence of two subscribing witnesses.

GUSTAF HOLMGREN.

Witnesses:
 HENNING G. TAUBE,
 J. M. BATTIN, Jr.